G. ESTES,

Assignor, by mesne assignments, of one-half interest to WHITEHEAD & ATHERTON MACHINE COMPANY.

Carding Machine.

No. 9,457. Reissued Nov. 9, 1880.

Inventor,
George Estes
by M. Bailey
his attorney

Witnesses.
Franck L. Durand
E. A. Dick

N. PETERS, PHOTO-LITHOGRAPHER, WASHINGTON, D. C.

UNITED STATES PATENT OFFICE.

GEORGE ESTES, OF LOWELL, MASSACHUSETTS, ASSIGNOR, BY MESNE ASSIGNMENTS, OF ONE-HALF INTEREST TO WHITEHEAD & ATHERTON MACHINE COMPANY, OF SAME PLACE.

CARDING-MACHINE.

SPECIFICATION forming part of Reissued Letters Patent No. 9,457, dated November 9, 1880.

Original No. 217,598, dated July 15, 1879. Application for reissue filed July 2, 1880.

*To all whom it may concern:*

Be it known that I, GEORGE ESTES, of the city of Lowell, in the county of Middlesex and State of Massachusetts, have invented certain new and useful Improvements in Carding-Machines for Separating Dirt and other Impurities from Cotton or other Fibrous Material, of which the following is a specification.

My invention consists in the combinations and arrangements of parts hereinafter described, and pointed out in the claims.

Figure 2:
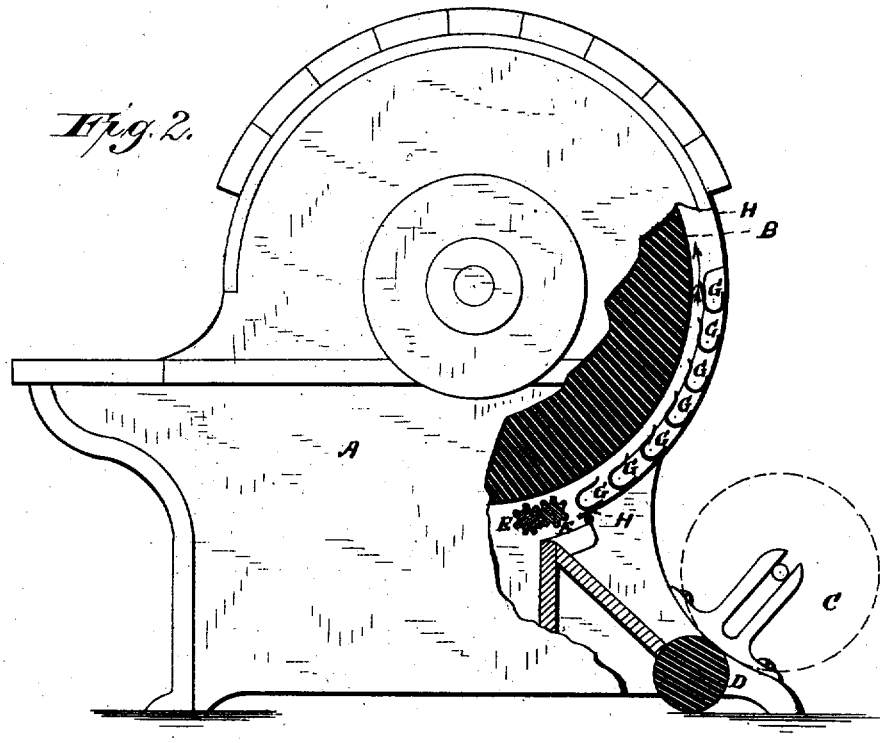
Figure 1:
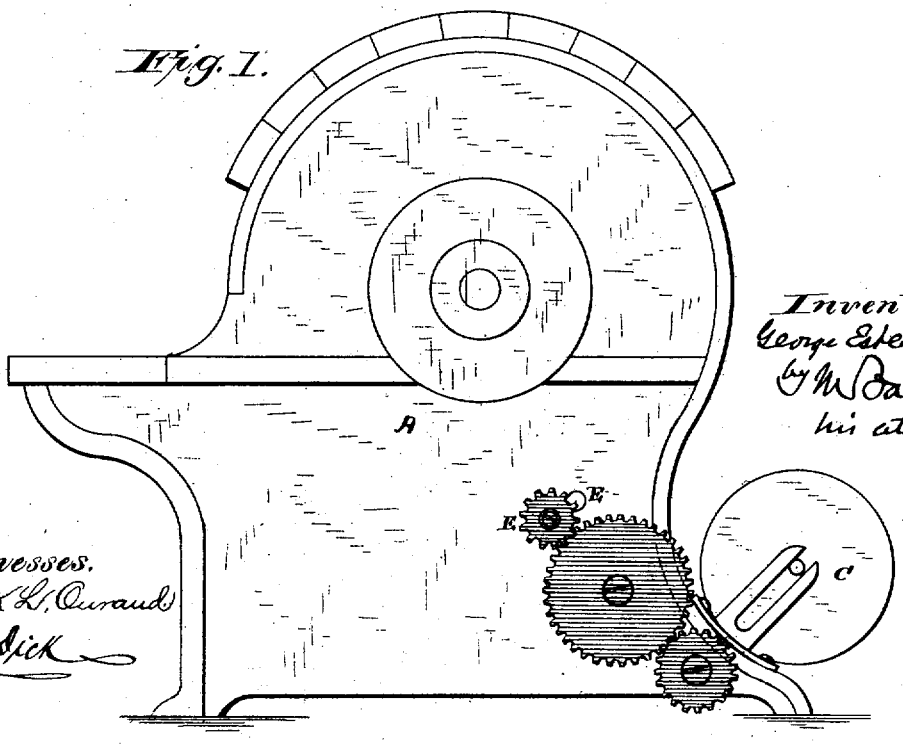

Figure 1 is a side view of a carding-engine with my improvements attached, and Fig. 2 is also a side view of the same, partly in section.

A is the frame; B, the cylinder; C, the lap. D is the roll by which the lap is unrolled and passed to the feed-rolls E, by which feed-rolls it is fed to the cylinder B. This is essentially the common mode of conveying the cotton from the lap to the cards; but it will be noticed that the position of the lap with relation to the cards is materially changed, it being placed near the floor, so that it can be fed to the cylinder well under it or near its vertical axis instead of (as is usual) on or about the line of its horizontal axis.

By placing the lap-roll and feed-rolls near the floor, the feed-rolls well under the cylinder, and the lap-roll as near to them as is possible to allow of the proper handling of the lap in its progress to the feed-rolls, I very materially shorten the card from what it is when the lap is fed at or about the line of the horizontal axis of the cylinder, thereby saving much room on the floor of the mill and enabling me to put in more carding-machines in given space—a matter of great importance.

Beyond the feed-rolls, in the direction of revolution of the main cylinder and below the center of the cylinder, I arrange upon a cover, H, a series of troughs or receptacles, G, set from one-quarter to an eighth of an inch from the face of the cylinder, the lower trough being placed as near as practicable to the feed-rolls, and the upper trough at or near the line of the horizontal axis of the cylinder.

Troughs or dirt-receptacles have been placed on a carding-engine between the feed-rolls and the top-flats; but heretofore, so far as I am aware, said troughs have been placed at some point above the center or horizontal axis of the cylinder. I, on the contrary, arrange the troughs on the back of the machine—that is to say, on the side on which the cotton enters the machine—at a point below the horizontal axis of the cylinder. The advantage derived from thus locating the troughs or receptacles is material. The dirt and leaf loosened from the cotton are thrown from the carding-cylinder, which revolves in the direction indicated by the arrow, into the collectors or receptacles, whereas if said receptacles were located above the center of the rapidly-revolving cylinder the tendency would be to throw the particles of leaf, &c., away from the receptacles, so that under the latter arrangement a large percentage of impurities would fail to be separated from the cotton. Under the arrangement which I have adopted, however, I remove a large quantity of the sand, leaf, &c., from the cotton while it is upon the cylinder and before it arrives at the flats, having actually, in practice, extracted more than one-half per cent. in weight of impurities from a lap of cotton. It necessarily follows that the cotton thus effectively treated before it is given to the flats must produce an exceptionally clean sliver, thread, and web.

As the cylinder revolves, the tendency of the fiber is to fly off from it. To neutralize this I form the troughs with edges curved toward the cylinder, as shown. The fiber, being met by these edges, is thrown back into place, while the loose dirt, leaf, &c., being heavier, fall naturally into the troughs, whose position below the horizontal axis of the cylinder facilitates such deposit. The direction of fall of loosened impurities is into the troughs placed below the horizontal axis of the cylinder just as naturally as it would be away from the troughs were the latter placed above the horizontal axis of the cylinder.

My improvements can be attached with a slight expense to the carding-engines now in general use by simply changing the lap and feed-rolls from the positions they now occupy to those shown in the drawings and adding the troughs and cover, as described.

I do not depend upon any mechanism for shaking the edges of the troughs, and thereby shaking the cotton, or upon any draft of air to influence the deposit of impurities, my object being to place the troughs so near the cotton that the centrifugal force of the cylinder will throw the cotton against their edges, and that the weight of the impurities detached by such impact will cause them to fall into the troughs and to remain there, the troughs and cylinder being so close to each other that any draft of air between them is practically impossible.

I am aware that troughs for cleaning the cotton have previously been placed on a carding-engine, and also that the lap and feed-rolls have been placed below the line of the horizontal axis of the cylinder. These I do not claim, broadly; but

What I claim as my invention is—

1. In a carding-machine, the combination, with the main cylinder, of dirt troughs or receptacles intermediate between the feed-rolls and the top-flats, and below the horizontal axis of said cylinder, substantially as hereinbefore set forth.

2. In a carding-machine, the combination, with the main cylinder and the feed-rolls and lap-roll arranged below the horizontal axis of said cylinder, of dirt troughs or receptacles located between the feed-rolls and the plane of the horizontal axis of the cylinder, substantially as hereinbefore set forth.

3. In a carding-machine, the combination, with the removable cover H, provided with the series of dirt-receptacles G G G, having inwardly-curved lips, of the feed-rolls E E and lap-roll C, said feed and lap rolls being located below the horizontal axis of the main cylinder, substantially as described In testimony whereof I have hereunto set my hand this 30th day of June, 1880.

GEORGE ESTES.

In presence of—

WILLIAM H. BENT,
EDWARD B. QUINN.